(12) United States Patent
Preisler et al.

(10) Patent No.: US 8,995,138 B2
(45) Date of Patent: Mar. 31, 2015

(54) ASSEMBLY INCLUDING A COMPRESSION-MOLDED, COMPOSITE PANEL WITH A HINGED MOUNTING FLANGE

(75) Inventors: Darius J. Preisler, Macomb, MI (US); Christopher A. Heikkila, Washington Township, MI (US)

(73) Assignee: Global IP Holdings, LLC, Sterling Heights, MI (US)

(*) Notice: Subject to any disclaimer, the term of this patent is extended or adjusted under 35 U.S.C. 154(b) by 340 days.

(21) Appl. No.: 13/603,552

(22) Filed: Sep. 5, 2012

(65) Prior Publication Data

US 2013/0278018 A1    Oct. 24, 2013

Related U.S. Application Data

(63) Continuation-in-part of application No. 13/453,201, filed on Apr. 23, 2012, now Pat. No. 8,690,233, and a continuation-in-part of application No. 13/453,269, filed on Apr. 23, 2012, now Pat. No. 8,795,465.

(51) Int. Cl.
*H05K 1/00*    (2006.01)
*B62D 25/20*   (2006.01)
*B60R 13/00*   (2006.01)
*B60R 13/01*   (2006.01)

(52) U.S. Cl.
CPC ......... *B62D 25/20* (2013.01); *Y10T 403/32606* (2015.01); *B60R 13/00* (2013.01); *B60R 13/013* (2013.01)
USPC .......................................... 361/749; 296/39.3

(58) Field of Classification Search
USPC ............ 361/749; 296/37.1, 37.8, 39.3, 97.23, 296/182.1, 184.1, 193.07; 428/95; 16/72, 16/277
See application file for complete search history.

(56) References Cited

U.S. PATENT DOCUMENTS

| | | | |
|---|---|---|---|
| 3,651,563 | A | 3/1972 | Volkmann |
| 3,750,525 | A | 8/1973 | Waters et al. |
| 4,717,612 | A | 1/1988 | Shackelford |
| 5,298,694 | A | 3/1994 | Thompson et al. |
| 5,316,604 | A | 5/1994 | Fell |
| 5,502,930 | A | 4/1996 | Burkette et al. |
| 5,915,445 | A | 6/1999 | Rauenbusch |
| 5,979,962 | A | 11/1999 | Balentin et al. |

(Continued)

OTHER PUBLICATIONS

Office Action; related U.S. Appl. No. 13/479,974; date of mailing Mar. 20, 2014.

(Continued)

*Primary Examiner* — Tremesha S Willis
(74) *Attorney, Agent, or Firm* — Brooks Kushman P.C.

(57) ABSTRACT

An assembly including a compression-molded, composite panel with a hinged mounting flange is provided. The panel includes first and second outer layers and a core having first and second portions positioned between the outer layers. The first portion has a large number of cavities and the second portion is substantially free of cavities. The second outer layer is bonded to the core by press molding. The first outer layer includes a first portion bonded to the first portion of the core by press molding and a second portion bonded to the second portion of the core to form the mounting flange pivotally connected to the first portion of the first outer layer. A component is mounted to the flange to pivot with the flange. A living hinge allows the flange and the mounted component to pivot between different use positions relative to the first portion of the first outer layer.

20 Claims, 3 Drawing Sheets

(56) References Cited

U.S. PATENT DOCUMENTS

| | | | |
|---|---|---|---|
| 6,050,630 | A | 4/2000 | Hochet |
| 6,102,464 | A | 8/2000 | Schneider et al. |
| 6,102,630 | A | 8/2000 | Flolo |
| 6,435,577 | B1 | 8/2002 | Renault |
| 6,537,413 | B1 | 3/2003 | Hochet et al. |
| 6,631,785 | B2 | 10/2003 | Khambete et al. |
| 6,655,299 | B2 | 12/2003 | Preisler et al. |
| 6,659,223 | B2 | 12/2003 | Allison et al. |
| 6,682,675 | B1 | 1/2004 | Vandangeot et al. |
| 6,682,676 | B1 | 1/2004 | Renault et al. |
| 6,720,058 | B1 | 4/2004 | Weeks et al. |
| 6,748,876 | B2 | 6/2004 | Preisler et al. |
| 6,790,026 | B2 | 9/2004 | Vandangeot et al. |
| 6,793,747 | B2 | 9/2004 | North et al. |
| 6,823,803 | B2 | 11/2004 | Preisler |
| 6,843,525 | B2 | 1/2005 | Preisler |
| 6,890,023 | B2 | 5/2005 | Preisler et al. |
| 6,918,625 | B2 | 7/2005 | Storto et al. |
| 6,926,348 | B2 | 8/2005 | Krueger et al. |
| 6,945,594 | B1 | 9/2005 | Bejin et al. |
| 6,981,863 | B2 | 1/2006 | Renault et al. |
| 7,014,259 | B2 | 3/2006 | Heholt |
| 7,059,646 | B1 | 6/2006 | DeLong et al. |
| 7,090,274 | B1 | 8/2006 | Khan et al. |
| 7,093,879 | B2 | 8/2006 | Putt et al. |
| 7,264,685 | B2 | 9/2007 | Katz et al. |
| 7,320,739 | B2 | 1/2008 | Thompson, Jr. et al. |
| 7,399,515 | B1 | 7/2008 | Thele |
| 7,402,537 | B1 | 7/2008 | Lenda et al. |
| 7,419,713 | B2 | 9/2008 | Wilkens et al. |
| 7,628,440 | B2 | 12/2009 | Bernhardsson et al. |
| 7,837,009 | B2 | 11/2010 | Gross et al. |
| 7,909,379 | B2 | 3/2011 | Winget et al. |
| 7,918,313 | B2 | 4/2011 | Gross et al. |
| 7,919,031 | B2 | 4/2011 | Winget et al. |
| 8,117,972 | B2 | 2/2012 | Winget et al. |
| 8,622,456 | B2 | 1/2014 | Preisler et al. |
| 8,690,233 | B2 | 4/2014 | Preisler et al. |
| 2004/0037995 | A1 | 2/2004 | Nicolai et al. |
| 2005/0189674 | A1 | 9/2005 | Hochet et al. |
| 2006/0255611 | A1 | 11/2006 | Smith et al. |
| 2008/0145635 | A1 | 6/2008 | Stoll et al. |
| 2008/0185866 | A1 | 8/2008 | Tarrant et al. |
| 2010/0026031 | A1 | 2/2010 | Jouraku |
| 2010/0060038 | A1 | 3/2010 | Takakura et al. |
| 2011/0315310 | A1 | 12/2011 | Trevisan et al. |
| 2013/0278002 | A1 | 10/2013 | Preisler et al. |
| 2013/0278003 | A1 | 10/2013 | Preisler et al. |
| 2013/0278009 | A1 | 10/2013 | Preisler et al. |
| 2013/0278015 | A1 | 10/2013 | Preisler et al. |
| 2013/0278018 | A1 | 10/2013 | Preisler et al. |
| 2013/0278019 | A1 | 10/2013 | Preisler et al. |
| 2013/0278020 | A1 | 10/2013 | Preisler et al. |
| 2013/0280469 | A1 | 10/2013 | Preisler et al. |
| 2013/0280472 | A1 | 10/2013 | Preisler et al. |
| 2013/0280473 | A1 | 10/2013 | Preisler et al. |
| 2013/0312652 | A1 | 11/2013 | Preisler et al. |
| 2013/0316123 | A1 | 11/2013 | Preisler et al. |
| 2014/0077518 | A1 | 3/2014 | Preisler et al. |
| 2014/0077530 | A1 | 3/2014 | Preisler et al. |
| 2014/0077531 | A1 | 3/2014 | Preisler et al. |
| 2014/0145465 | A1 | 5/2014 | Preisler et al. |
| 2014/0145470 | A1 | 5/2014 | Preisler et al. |
| 2014/0147617 | A1 | 5/2014 | Preisler et al. |
| 2014/0147622 | A1 | 5/2014 | Preisler et al. |

OTHER PUBLICATIONS

Office Action; related U.S. Appl. No. 13/686,362; date of mailing Mar. 25, 2014.
Office Action; related U.S. Appl. No. 13/523,253; date of mailing Mar. 25, 2014.
Office Action; related U.S. Appl. No. 13/688,972; date of mailing Mar. 28, 2014.
Office Action; related U.S. Appl. No. 13/687,232; date of mailing Mar. 28, 2014.
Office Action; related U.S. Appl. No. 13/689,809; date of mailing Mar. 31, 2014.
Office Action; related U.S. Appl. No. 13/687,213; date of mailing Mar. 31, 2014.
Office Action; related U.S. Appl. No. 13/690,265; date of mailing Mar. 31, 2014.
Office Action; related U.S. Appl. No. 13/762,904; date of mailing Apr. 8, 2014.
Office Action; related U.S. Appl. No. 13/762,800; date of mailing Apr. 8, 2014.
Office Action; related U.S. Appl. No. 13/762,861; date of mailing Apr. 9, 2014.
Office Action; related U.S. Appl. No. 13/690,566; date of mailing Apr. 9, 2014.
Office Action; related U.S. Appl. No. 13/762,832; date of mailing Apr. 11, 2014.
Office Action; related U.S. Appl. No. 13/762,921; date of mailing Apr. 14, 2014.
Notice of Allowance; related U.S. Appl. No. 13/686,388; date of mailing Apr. 15, 2014.
Related U.S. Appl. No. 13/690,566, filed Nov. 30, 2012.
Related U.S. Appl. No. 13/762,921, filed Feb. 8, 2013.
Related U.S. Appl. No. 13/762,956, filed Feb. 8, 2013.
Office Action; related U.S. Appl. No. 13/453,201 (now USPN 8,690,233); date of mailing Nov. 20, 2013.
Office Action; related U.S. Appl. No. 13/523,209 (now USPN 8,622,456) date of mailing Apr. 29, 2013.
Office Action; Related U.S. Appl. No. 13/479,974; Date of mailing Oct. 15, 2014.

ASSEMBLY INCLUDING A COMPRESSION-MOLDED, COMPOSITE PANEL WITH A HINGED MOUNTING FLANGE

CROSS-REFERENCE TO RELATED APPLICATIONS

This application is a continuation-in-part of both U.S. patent application entitled "Carpeted Automotive Vehicle Load Floor Having a Living Hinge" filed Apr. 23, 2012 and having U.S. Ser. No. 13/453,201 and U.S. patent application entitled "Method of Making a Sandwich-Type Composite Panel Having a Living Hinge and Panel Obtained by Performing the Method" also filed Apr. 23, 2012 and having U.S. Ser. No. 13/453,269, both of which are incorporated by reference herein in their entirety.

TECHNICAL FIELD

This invention relates, in general, to the field of compression-molded, composite panels and, in particular, to assemblies including such panels with hinged mounting flanges.

Overview

Sandwich-type composite panels including cores have very important characteristics because of their light weight and high strength. Conventionally, such panels are constructed by sandwiching a core having a large number of cavities and having low strength characteristics between two outer layers or skins, each of which is much thinner than the core but has excellent mechanical characteristics.

The prior art discloses a method of making a panel of sandwich-type composite structure having a cellular core in a single processing step. In that method, the panel is made by subjecting a stack of layers of material to cold-pressing in a mold. As shown in FIG. 1, the stack is made up of: at least a first skin made of a reinforced thermoplastics material, a cellular core made of a thermoplastics material, and a second skin also made of a reinforced thermoplastics material. The stack may also include one or more external covering layers made of a woven or nonwoven thermoplastic material. The skins may be pre-heated outside the mold or heated inside the mold to a softening temperature.

Such a method is particularly advantageous because of the fact that it makes it possible, in a single operation, to generate cohesion and bonding between the various layers of the composite structure as shown in FIG. 2, and to shape the resulting panel while preserving all of the mechanical properties imparted by the cellular-core, sandwich structure.

Panels of sandwich-type composite structure having a cellular core have rigidity characteristics sufficient to enable mechanical structures subjected to large stresses to be reinforced structurally without making them too heavy. Such panels are in common use in shipbuilding, aircraft construction, and rail vehicle construction.

To maximize the functionality of such panels, it is known, in particular, that hinges can be added so that the panels can be hinged to other panels. Such hinges typically are separate parts that are fixed to the panels by gluing, welding, riveting, or some other fastening technique.

Such hinges are fixed to the sandwich-structure composite panels in a separate and subsequent operation, after said panels have been formed. That subsequent operation requires an additional workstation, be it automated or otherwise, which increases, in particular, the manufacturing time and cost of the finished parts.

In addition, the fact that separate, external parts are mounted on a composite panel of the sandwich-type is a source of quality defects, and thus adds to the cost of making such panels.

Published U.S. Patent Application 2005/0189674 discloses a method of making a composite panel of sandwich structure provided with a hinge. The panel includes a stack made up of a first skin of a reinforced thermoplastics material, a cellular core made of a thermoplastics material, and a second skin made of a reinforced thermoplastics material. The panel is formed by pressing the stack in a mold. The first and second skins are preheated to a softening temperature. As shown in FIGS. 3 and 4, after the panel has formed, an incision is made at a determined place in the panel so as to cut through one of the first and second skins, and substantially through the entire thickness of the cellular core, while leaving the other skin intact so that it forms a living hinge between two portions of the incised panel.

Other U.S. patent documents related to the present invention include: U.S. Pat. No. 5,298,694; U.S. Pat. No. 5,502,930; U.S. Pat. No. 5,915,445; U.S. Pat. No. 5,979,962; U.S. Pat. No. 6,050,630; U.S. Pat. No. 6,102,464; U.S. Pat. No. 6,435,577; U.S. Pat. No. 6,537,413; U.S. Pat. No. 6,631,785; U.S. Pat. No. 6,655,299; U.S. Pat. No. 6,659,223; U.S. Pat. No. 6,682,675; U.S. Pat. No. 6,793,747; U.S. Pat. No. 6,748,876; U.S. Pat. No. 6,790,026; U.S. Pat. No. 6,682,676; U.S. Pat. No. 6,823,803; U.S. Pat. No. 6,843,525; U.S. Pat. No. 6,890,023; U.S. Pat. No. 6,981,863; U.S. Pat. No. 7,014,259; U.S. Pat. No. 7,090,274; U.S. Pat. No. 7,093,879; U.S. Pat. No. 7,264,685; U.S. Pat. No. 7,320,739; U.S. Pat. No. 7,402,537; U.S. Pat. No. 7,419,713; U.S. Pat. No. 7,837,009; U.S. Pat. No. 7,909,379; U.S. Pat. No. 7,918,313; U.S. Pat. No. 7,919,031; U.S. Pat. No. 8,117,972; 2006/0255611; 2008/0185866 and 2011/0315310.

One problem associated with prior art assemblies having such panels as load floors in the automotive industry is that the assemblies typically require many assembly steps often involving costly labor which adds to the cost and time of assembly manufacture. Also, some of the materials making up such assemblies are often non-recyclable.

Some panel assemblies such as load floor assemblies have components which are pivotable with metal hinges. However, such hinges are often unsightly and heavy and the components are difficult and unwieldly to pivot with a single hand.

SUMMARY OF EXAMPLE EMBODIMENTS

An object of at least one embodiment of the present invention is to provide an assembly, such as a vehicle floor panel assembly, including a pivotable component, which is lightweight, and aesthetically pleasing wherein a hinged mounting flange of the assembly is capable of withstanding repeated cyclic loading.

In carrying out the above object and other objects of at least one embodiment of the present invention, an assembly including a compression-molded, composite panel is provided. The panel includes first and second outer layers and a core having first and second portions positioned between the outer layers. The first portion of the core has a large number of cavities and the second portion of the core is substantially free of cavities. The second outer layer is bonded to the core by press molding. The first outer layer includes a first portion bonded to the first portion of the core by press molding and a second portion bonded to the second portion of the core to form a mounting flange pivotally connected to the first portion of the first outer layer. The assembly also includes a component mounted to the mounting flange to pivot with the mounting flange. The assembly further includes a living hinge which allows the mounting flange and the mounted component to pivot between different use positions relative to the first portion of the first outer layer.

The assembly may include at least one fastener for fastening the component to the mounting flange.

Each fastener may be a threaded fastener wherein the component includes a threaded part to hold the threaded fastener to the component.

The mounting flange may include at least one hole which extends completely through the mounting flange. Each fastener may be externally threaded. The threaded part may include an internally threaded hole. Each fastener may extend through its corresponding hole in the mounting flange and be threadedly secured within its internally threaded hole.

The assembly may further include a substantially continuous carpet layer bonded to an upper surface of the first outer layer including the first and second portions of the first outer layer to at least partially form a carpeted composite panel having a carpeted mounting flange. The living hinge may include a portion of the carpet layer.

The first outer layer may be made out of polymeric material wherein the living hinge is at least partially made out of the polymeric material.

The assembly may further include a second living hinge which facilitates or allows the mounting flange and the mounted component to pivot between the different use positions.

The assembly may further include a substantially continuous carpet layer bonded to an outer surface of the first outer layer including the first and second portions of the first outer layer to at least partially form a carpeted composite panel having a carpeted mounting flange. Each of the first and second living hinges may include a portion of the carpet layer.

A portion of the mounted component may have a reduced thickness to form a depression which receives the mounting flange.

A portion of the mounted component may have a reduced thickness to form a depression which receives the carpeted mounting flange wherein thickness of the carpeted mounting flange is substantially equal to depth of the depression.

The first outer layer including the first and second portions may be a fiber-reinforced, thermoplastic layer.

Further in carrying out the above object and other objects of at least one embodiment of the present invention, a vehicle assembly including a compression-molded, composite panel with a hinged mounting flange is provided. The panel includes first and second fiber-reinforced, outer layers and a core having first and second portions positioned between the outer layers. The first portion of the core has a large number of cavities and the second portion of the core is substantially free of cavities. The second outer layer is bonded to the core by press molding. The first outer layer has an outer surface and includes a first portion bonded to the first portion of the core by press molding and a second portion bonded to the second portion of the core to form a mounting flange pivotally connected to the first portion of the first outer layer. The assembly also includes a component mounted to the mounting flange to pivot with the mounting flange within the interior of the vehicle. The assembly further includes a living hinge which allows the mounting flange and the mounted component to pivot between different use positions relative to the first portion of the first outer layer.

The assembly may include a carpet layer such as a thermoplastic carpet layer bonded to the load bearing surface of the first outer layer. The thermoplastic of the first outer layer including the first and second portions and the carpet layer may be polypropylene.

The composite panel may have a thickness in the range of 5 to 25 mm.

The outer layers may be fiber-reinforced thermoplastic layers wherein the first outer layer has a load bearing surface.

The core may be a cellular core.

The core may have a honeycomb structure.

Still further in carrying out the above object and other objects of at least one embodiment of the present invention, a vehicle floor panel assembly is provided. The assembly includes a compression-molded panel including first and second fiber-reinforced, outer layers and a core having first and second portions positioned between the outer layers. The first portion of the core has a large number of cavities and the second portion of the core is substantially free of cavities. The second outer layer is bonded to the core by press molding. The first outer layer has a load-bearing surface and includes a first portion bonded to the first portion of the core by press molding and a second portion bonded to the second portion of the core to form a mounting flange pivotally connected to the first portion of the first outer layer. The assembly also includes a component mounted to the mounting flange to pivot with the mounting flange in an interior of the vehicle. The assembly further includes a living hinge which allows the mounting flange and the mounted component to pivot between different use positions relative to the first portion of the first outer layer.

A portion of a carpet layer bonded to the load-bearing surface of the first outer layer may at least partially form the first living hinge. A second portion of the carpet layer may at least partially form the second living hinge.

Other technical advantages will be readily apparent to one skilled in the art from the following figures, descriptions and claims. Moreover, while specific advantages have been enumerated, various embodiments may include all, some or none of the enumerated advantages.

DETAILED DESCRIPTION OF EXAMPLE EMBODIMENTS

Figure 1:
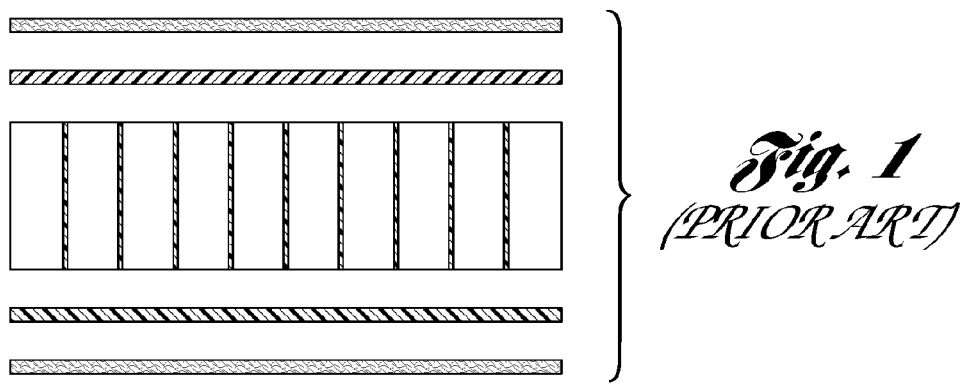
FIG. 1 is a side sectional view showing various separate layers of a prior art stack of thermoplastic-based layers of material.
Figure 2:
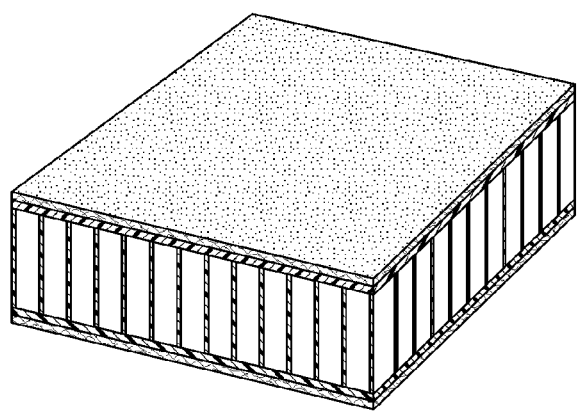
FIG. 2 is a top perspective sectional view of the stack of FIG. 1 after compression molding.
Figure 3:
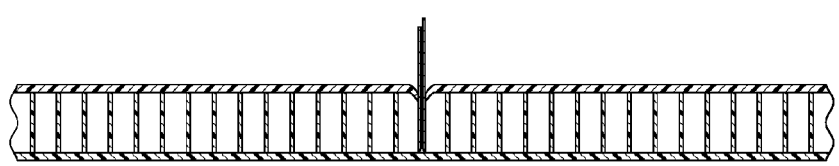
FIGS. 3 and 4 are side views, partially broken away and in cross section, of a prior art sandwich-type composite panel having a living hinge and method of making the living hinge.
Figure 4:
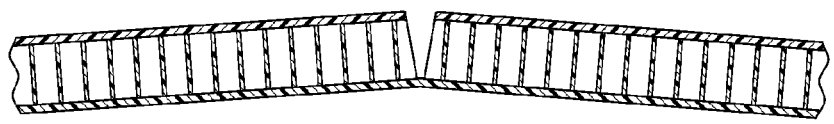
Figure 5:
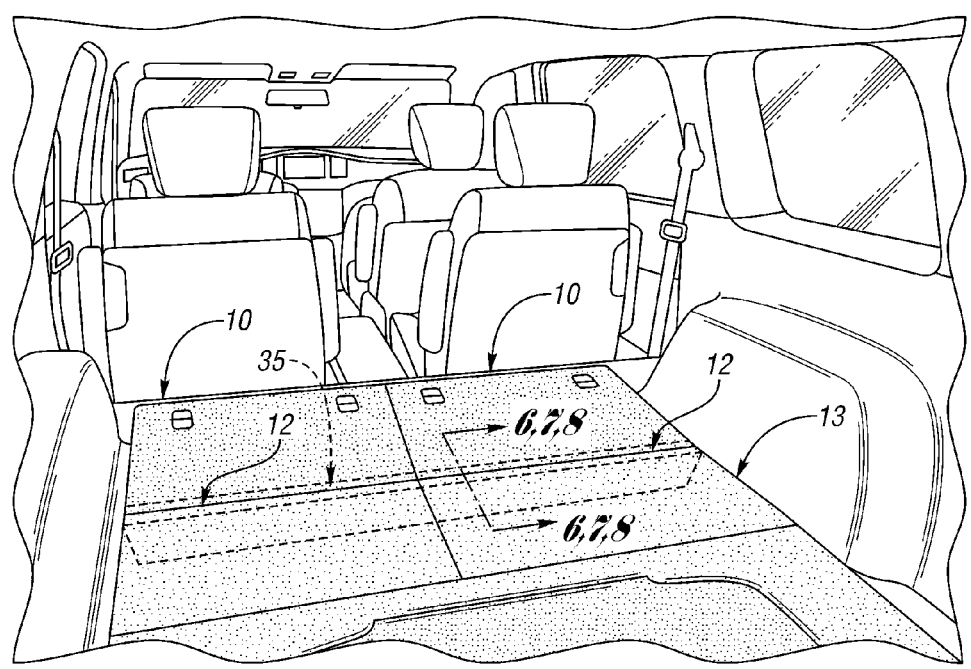
FIG. 5 is an environmental view, partially broken away, of a carpeted automotive vehicle load floor including a pair of carpeted, sandwich-type, compression-molded, composite panel assemblies each being constructed in accordance with at least one embodiment of the present invention.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring now to the FIGS. 5, 6, 7, and 8 different embodiments of an assembly including a compression-molded composite panel with a hinged mounting flange are provided. In one example embodiment, a carpeted automotive vehicle load floor, generally indicated at 13, includes a pair of carpeted, compression-molded, sandwich-type, composite hinged panel assemblies, generally included at 10. In one example embodiment, the assembly 10 (FIG. 6) has a single living hinge 12. In a second example embodiment, the assembly 10 (FIG. 7) has a single living hinge 12 and an elongated top decorative depression 46. In a third example embodiment, the assembly 10 (FIG. 8) has a pair of spaced apart living hinges 12'. However, it is to be understood that one or more panel assemblies 10 constructed in accordance with at least one embodiment of the present invention may be used in a wide variety of environments besides the automotive vehicle environment of FIG. 5.

Each panel of the panel assembly 10 (FIGS. 6, 7 and 8) is typically manufactured by providing a stack of materials located or positioned within a mold. The stack includes first and second reinforced thermoplastic skins or outer layers 20 and 22, respectively, a core having a large number of cavities such as a thermoplastic cellular core 24 disposed between and bonded to the skins 20 and 22 by press molding within the mold. A substantially continuous covering or carpet layer 26 made of thermoplastics material covers and is bonded to the first skin 20 which provides a top carpeted support surface. The skins 20 and 22 are heated typically outside of the mold to a softening temperature. The mold is preferably a low-pressure, compression mold which performs a thermo-compression process on the stack of materials.

Figure 6:
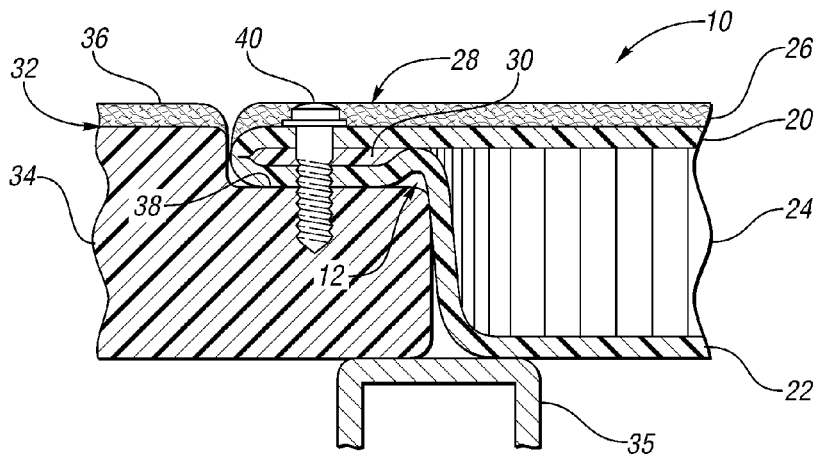
FIG. 6 is a side view, partially broken away and in cross section, of one embodiment of one of the panel assemblies taken along lines 6-6 of FIG. 5.
Figure 7:
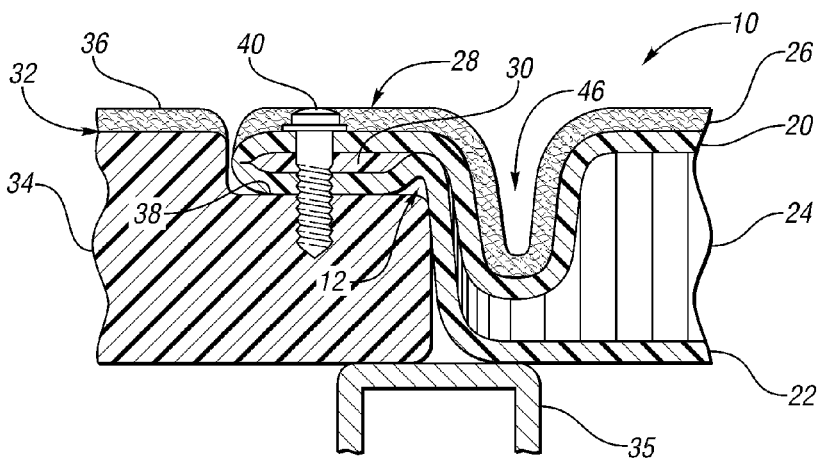
FIG. 7 is a view, similar to the view of FIG. 6, but showing a second embodiment of one of the panel assemblies taken along lines 7-7 of FIG. 5.
Figure 8:
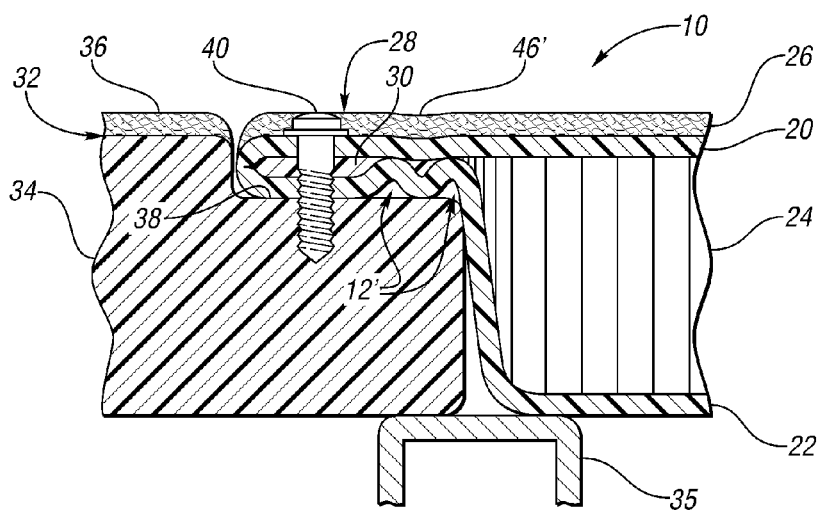
FIG. 8 is a view, similar to the views of FIGS. 6 and 7, but showing a third embodiment of one of the panel assemblies taken along lines 8-8 of FIG. 5.

The outer skin 20 is divided into a first portion bonded to a first portion of the core 24 and a second portion bonded to a second portion 30 of the core 20 which is substantially free of cavities (i.e. is substantially solid) to at least partially form a mounting flange 28 pivotally connected to the first portion of the skin 20 by the living hinge 12. In other words, as shown in FIGS. 6, 7 and 8, the outer skin 20 is divided into a first portion bonded to the first portion of the core 20 (which has cavities) and a second portion bonded to a second portion of core 20 (which is substantially solid) to at least partially form the mounting flange 28 pivotally connected to the first portion of the skin 12 by the living hinge(s) (12 or 12').

The assembly 10 also includes a component such as a thermoplastic component, generally indicated at 32, which is mounted to the mounting flange 28 to pivot with the mounting flange 28 about the living hinge 12. The living hinge 12 allows the mounting flange 28 and the mounted component 32 to pivot between different use positions relative to the first (right most as shown in FIGS. 6-8) portion of the first layer 20.

A portion 36 of the thermoplastic carpet layer 26 covers and is bonded to an upper surface of a plastic part 34 of the component 32 to provide an upper carpeted support surface. An intermediate portion of the layer 26 at least partially forms the living hinge 12. The living hinge 12 allows the carpeted mounting flange 28 to pivot between the different use positions.

The assembly 10 (of FIGS. 6, 7 and 8) may also include at least one threaded or non-threaded fastener for fastening the component 32 to the mounting flange 28. The fastener may be any of various devices for fastening the component 32 to the mounting flange 28 such as an externally threaded screw 40 or bolt. The screw 40 is characterized by a helical ridge, or external thread, wrapped around a cylinder. The screw threads mate with a complementary thread or internal thread in the part 34. The internal thread may be in the form of a nut or an object that has the internal thread formed into it. The screw thread may also cut a helical groove in the softer material of the part 34 as the screw 40 is inserted. The head of the screw 40 is preferably decorative.

Each screw 40 may be made from a wide range of materials, with steel being perhaps the most preferred, in many varieties. Where great resistance to corrosion is required, stainless steel, titanium, brass, bronze, monel or silicon bronze may be used. Galvanic corrosion of dissimilar metals can be prevented by a careful choice of material.

Some types of plastic, such as nylon or polytetrafluoroethylene (PTFE), can be threaded and used for fastenings requiring moderate strength and great resistance to corrosion or for the purpose of electrical insulation. A surface coating may be used to protect the fastener from corrosion (e.g. bright zinc plating for steel screws), to impart a decorative finish (e.g. jappaning) or otherwise alter the properties of the base material. Selection criteria of the screw materials include temperature, required strength, resistance to corrosion, joint material and cost.

The panel assembly 10 may also include a plastic mounted support or bar 35 which extends across the width of the storage area under the assembly 10 to support the component 32 and the panel of the assembly 10 at the living hinge(s) 12 or 12'.

The carpet layer 26 may be a resin carpet and the resin may be polypropylene. The carpet layer 26 may be made of a woven or nonwoven material (typically of the carpet type).

Referring now to FIG. 7, a second embodiment of an assembly is generally indicated at 10. The assembly 10 is substantially identical to the assembly 10 of FIG. 6 but includes a top and relatively deep decorative depression 46 formed during the compression molding process by a projection supported or suspended at the inner mold surface of an upper mold half.

Referring now to FIG. 8, a third embodiment of an assembly is generally indicated at 10. The parts of the assembly 10 which are the same in either structure and/or function to the parts of FIGS. 6 and 7 have the same reference number. In general, the assembly 10 of FIG. 8 differs from the assembly of FIG. 6 by having two living hinges 12' with a mounting flange 28 and a decorative depression 46' to further facilitate or allow the carpeted mounting flange 28 and mounted component 32 to pivot between different use positions. Also, while shown solid, the part 34 may be hollow to provide a component 32 which may be lighter in weight than the solid part 34 of FIGS. 6, 7, and 8.

The cellular core 24 may be a honeycomb core. In this example, the cellular core 24 has an open-celled structure of the type made up of tubes or a honeycomb, and it is made mainly of polyolefin and preferably of polypropylene. It is also possible to use a cellular structure having closed cells of the foam type.

The member or component 32 may be made of a different material(s) to which the portion 36 of the carpet layer 26 is bonded.

Each of the skins 20 and 22 of each of the assemblies 10 may be fiber reinforced. The thermoplastic of the skins 20 and 22, the covering carpet layer 26 and the core 24 may be polypropylene. At least one of the skins 20 and 22 may be a woven skin, such as polypropylene skin. Each of the skins 20 and 22 may be reinforced with fibers, e.g., glass fibers, carbon fibers or natural fibers. At least one of the skins 20 and 22 may advantageously be made up of woven glass fiber fabric and of a thermoplastics material.

Each resulting hinged panel assembly 10 may have a thickness in the range of 5 to 25 mm. A depression 38 formed in the part 34 and in which the mounting flange 28 is secured may have a depth in the range of 2 to 10 mm.

In one example method of making the hinged panel assembly 10 including the mounting flange 28, stacks of material are pressed in a low pressure, cold-forming mold. With respect to a first part of the hinged panel assembly 10, the stack is made up of the first skin 20, the cellular core 24, the second skin 22 and a portion of the covering layer 26, and the stack is pressed at a pressure lying in the range of $10 \times 10^5$ Pa. to $30 \times 10^5$ Pa. The first and second skins 20 and 22 are preferably pre-heated to make them malleable and stretchable. Advantageously, in order to soften the first and second skins 20 and 22, respectively, heat is applied to a pre-assembly constituted by the stack made up of at least the first skin 20, of the cellular core 24, and the second skin 22 so that, while the first part of the panel of the assembly 10 is being formed in the mold, the first and second skins 20 and 22 have a forming temperature lying approximately in the range of 160° C. to 200° C., and, in this example, about 180° C. In like fashion, the mounting flange 28 may be formed. However, in forming the mounting flange 28, the living hinge 12 (or hinges 12') may be formed by performing the method of the above-noted patent application entitled "Method of Making a Sandwich Type Composite Panel Having a Living Hinge and Panel Obtained by Performing the Method."

The covering carpet layer 26 is substantially continuous and may be formed from separate pieces of thermoplastic resin carpet which are subsequently bonded or fused together, such as by heat and/or pressure to carpet the entire top support surface of the hinged panel assembly 10.

In summary, FIGS. 6, 7 and 8 show first, second and third embodiments, respectively, of a carpeted, sandwich-type, composite hinged panel assembly 10. The assemblies 10 have basically the same structure and function except in the first embodiment of FIG. 6 a single living hinge 12 is provided, in the second embodiment a single living hinge 12 with a deep decorative groove 46 are provided and in the third embodiment a pair of living hinges 12' with a shallow depression 46' are provided.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An assembly comprising:
    a compression-molded, composite panel including first and second outer layers and a core having first and second portions positioned between the outer layers, the first portion having a plurality of cavities and the second portion being substantially free of cavities, wherein the second outer layer is bonded to the core by press molding and the first outer layer includes a first portion bonded to the first portion of the core by press molding and a second portion bonded to the second portion of the core to form a mounting flange pivotally connected to the first portion of the first outer layer;
    a component mounted to the mounting flange to pivot with the mounting flange; and
    a living hinge which allows the mounting flange and the mounted component to pivot between different use positions relative to the first portion of the first outer layer wherein the mounting flange is formed by a crushed portion of the composite panel adjacent the living hinge to form a depression which receives the component.

2. The assembly as claimed in claim 1, further comprising at least one fastener for fastening the component to the mounting flange.

3. The assembly as claimed in claim 2, wherein each fastener is a threaded fastener and wherein the component includes a threaded part to hold the threaded fastener to the component.

4. The assembly as claimed in claim 3, wherein the mounting flange includes at least one hole which extends completely through the mounting flange, wherein each fastener is externally threaded, wherein the threaded part includes an internally threaded hole and wherein each fastener extends through its corresponding hole in the mounting flange and is threadedly secured within its internally threaded hole.

5. The assembly as claimed in claim 1, further comprising a substantially continuous carpet layer bonded to an upper surface of the first outer layer including the first and second portions of the first outer layer to at least partially form a carpeted composite panel having a carpeted mounting flange.

6. The assembly as claimed in claim 5, wherein the living hinge includes a portion of the carpet layer.

7. The assembly as described in claim 1 wherein the first outer layer is made out of polymeric material and wherein the living hinge is at least partially made out of the polymeric material.

8. The assembly as claimed in claim 1, further comprising a second living hinge which facilitates or allows the mounting flange and the mounted component to pivot between the different use positions.

9. The assembly as claimed in claim 8, further comprising a substantially continuous carpet layer bonded to an outer surface of the first outer layer including the first and second portions of the first outer layer to at least partially form a carpeted composite panel having a carpeted mounting flange.

10. The assembly as claimed in claim 9, wherein each of the first and second living hinges includes a portion of the carpet layer.

11. The assembly as claimed in claim 1, wherein a portion of the mounted component has a reduced thickness to form a depression which receives the mounting flange.

12. The assembly as claimed in claim 5, wherein a portion of the mounted component has a reduced thickness to form a depression which receives the carpeted mounting flange and wherein thickness of the carpeted mounting flange is substantially equal to depth of the depression.

13. The assembly as claimed in claim 5, wherein the first outer layer including the first and second portions is a fiber-reinforced, thermoplastic layer.

14. The assembly as claimed in claim 13, wherein the carpet layer is a thermoplastic carpet layer and wherein the thermoplastic of the first outer layer including the first and second portions and the carpet layer is polypropylene.

15. The assembly as claimed in claim 1, wherein the composite panel has a thickness in the range of 5 to 25 mm.

16. The assembly as claimed in claim 1, wherein the outer layers are fiber-reinforced thermoplastic layers and wherein first outer layer has a load bearing surface.

17. The assembly as claimed in claim 1, wherein the core is a cellular core.

18. The assembly as claimed in claim 1, wherein the core has a honeycomb structure.

19. A vehicle assembly comprising:
a compression-molded, composite panel including first and second fiber-reinforced, outer layers and a core having first and second portions positioned between the outer layers, the first portion having a plurality of cavities and the second portion being substantially free of cavities, wherein the second outer layer is bonded to the first portion of the core by press molding and the first outer layer has an outer surface and includes a first portion bonded to the first portion of the core by press molding and a second portion bonded to the second portion of the core to form a mounting flange pivotally connected to the first portion of the first outer layer;
a component mounted to the mounting flange to pivot with the mounting flange within an interior of a vehicle; and
a living hinge which allows the mounting flange and the mounted component to pivot between different use positions relative to the first portion of the first outer layer wherein the mounting flange is formed by a crushed portion of the composite panel adjacent the living hinge to form a depression which receives the component.

20. A vehicle floor panel assembly comprising:
a compression-molded, composite panel including first and second fiber-reinforced, outer layers and a core having first and second portions positioned between the outer layers, the first portion having a plurality of cavities and the second portion being substantially free of cavities, wherein the second outer layer is bonded to the core by press molding and the first outer layer has a load-bearing surface and includes a first portion bonded to the first portion of the core by press molding and a second portion bonded to the second portion of the core to form a mounting flange pivotally connected to the first portion of the first outer layer;
a component mounted to the mounting flange to pivot with the mounting flange in an interior of a vehicle; and
a living hinge which allows the mounting flange and the mounted component to pivot between different use positions relative to the first portion of the first outer layer wherein the mounting flange is formed by a crushed portion of the composite panel adjacent the living hinge to form a depression which receives the component.

\* \* \* \* \*

UNITED STATES PATENT AND TRADEMARK OFFICE
CERTIFICATE OF CORRECTION

PATENT NO.       : 8,995,138 B2  
APPLICATION NO.  : 13/603552  
DATED            : March 31, 2015  
INVENTOR(S)      : Darius J. Preisler et al.

Page 1 of 1

It is certified that error appears in the above-identified patent and that said Letters Patent is hereby corrected as shown below:

In the Claims

Column 8, Lines 64-65, Claim 16:

After "and wherein" and before "first outer layer"  
Insert -- the --.

Signed and Sealed this  
Eleventh Day of August, 2015

Michelle K. Lee  
*Director of the United States Patent and Trademark Office*